UNITED STATES PATENT OFFICE.

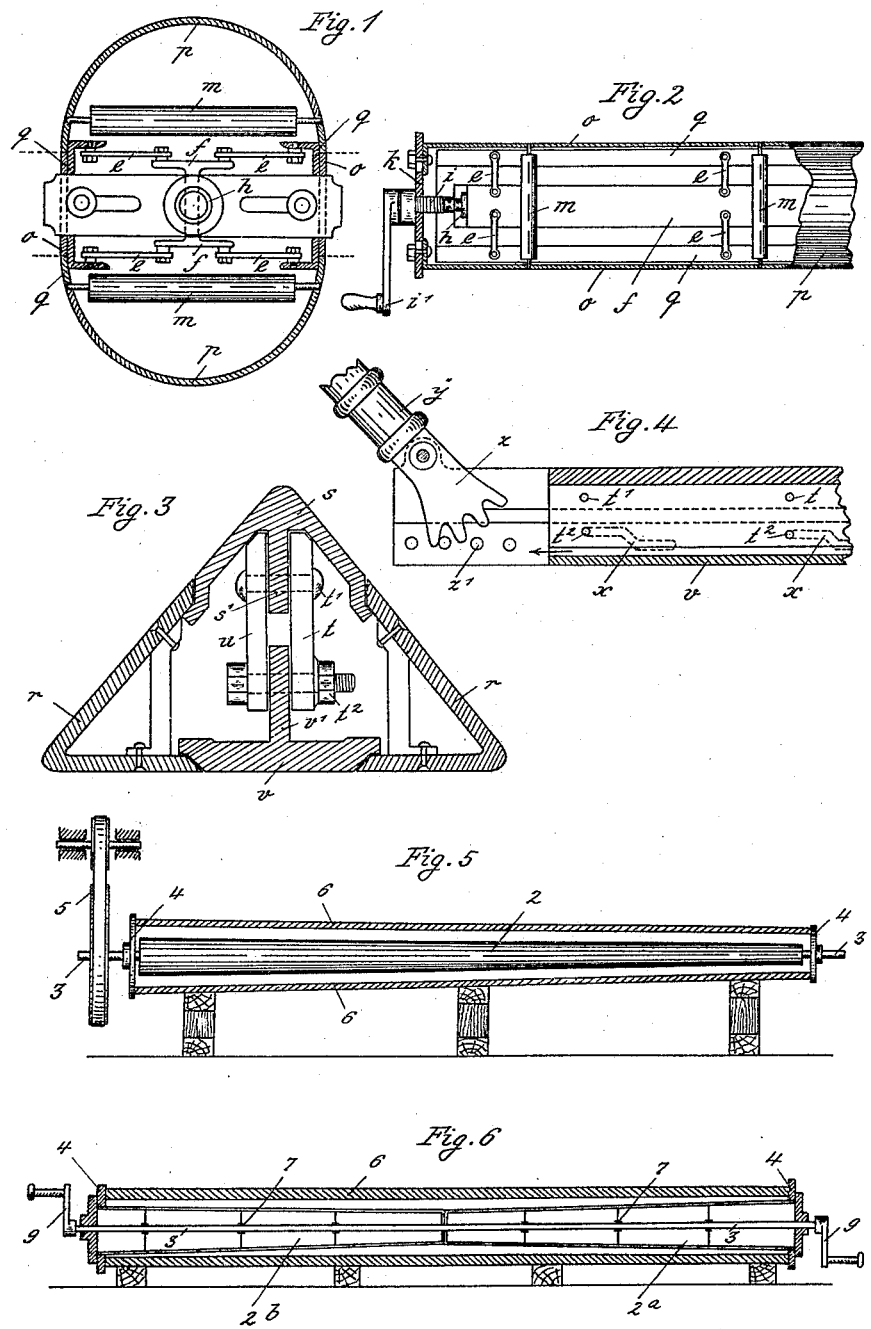

FRITZ EMMRICH, OF FREIBERG, GERMANY.

MOLD-CORE FOR CONCRETE BODIES.

1,390,104.

Specification of Letters Patent. Patented Sept. 6, 1921.

Application filed February 25, 1920. Serial No. 361,120½.

*To all whom it may concern:*

Be it known that I, FRITZ EMMRICH, a citizen of the German Republic, and residing at Freiberg, Germany, have invented certain new and useful Improvements in Mold-Cores for Concrete Bodies, of which the following is a specification.

In manufacturing hollow concrete bodies such as beams, masts, posts or the like, so-called cores are employed as known in the art, which cores are drawn out from the bodies after the moldings are finished. My present invention is characterized by certain novel features, which simplify and facilitate the removal of said mold cores.

In the annexed drawing,

Figures 1 and 2 show a so-called shear core in cross-section and longitudinal section.

Figs. 3 and 4 show a so-called slot core in cross-section and longitudinal section, while Figs. 5 and 6 are longitudinal sections through a conical mold core and a double-cone-shaped mold core respectively.

The cross-sectional shapes of the cores as shown are illustrated as examples only, the cores can be made also with oval, round, triangular or polygonal cross-sections.

The core is made of three parts, namely a center part $o$ and two equally shaped outer parts $p$. Each of the latter is formed as a whole, while the center part is composed of two mold walls; on the internal side of each wall two rails $q$ are provided and two series of parallel so-called guide-bars or links $e$ are pivoted with one of their ends to said rails, while their other ends are pivoted to the foot members of a H-rail $f$, which passes approximately through the whole core and is carried by the guide-bars or links $e$. The parts $q$, $e$ and $f$ form together a so-called double shear. To the rail $f$ a lug $h$ is attached, in which the end of a spindle $i$, provided with a crank $i^1$, is inserted in such a manner that it can rotate within the lug but is coupled to the same with regard to co-axial movement, the spindle $i$ screwing in a plate $k$ provided at one end of the core. In each outer mold part $p$ a plurality of metal rollers $m$ are arranged.

The operation is as follows:—

During the molding, the core is extended or unfolded in the manner illustrated, and after the molding is finished, the spindle $i$ is turned in such a way that thereby the H-rail is carried along. On account of this movement a contraction of the two mold walls by means of the guide-bars or links $e$ is effected. On account of this contraction the upper outer mold part $p$ is lowered, so that its rollers $m$ enter into engagement with the rails $q$; then the upper mold part can be wheeled out upon the rails.

In the same way also the center part $o$ can be removed, the rails $q$ of which have entered into engagement with the rollers $m$ of the lower mold half, whereupon finally said last or third part of the mold is drawn out. This feature of dividing the mold into three parts has the advantage, that regarding the removal of the mold it is immaterial whether the workpiece rests on its base or reversed.

What I claim, is:—

In a mold core for concrete bodies, in combination, two rigid outer parts, conveying rollers therein, and a contractible center part consisting of two mold walls, a H-rail therein and connection-links between said rail and walls, substantially as and for the purpose set forth.

In testimony whereof I have hereunto set my hand in the presence of two subscribing witnesses.

FRITZ EMMRICH.

Witnesses:
 FRITZ SOODTMANN,
 FRITZ GÜNTHER.